March 16, 1943.  N. CAPAY  2,314,074
TURNPLATE FOR CANE SUGAR MILLS
Filed April 8, 1941
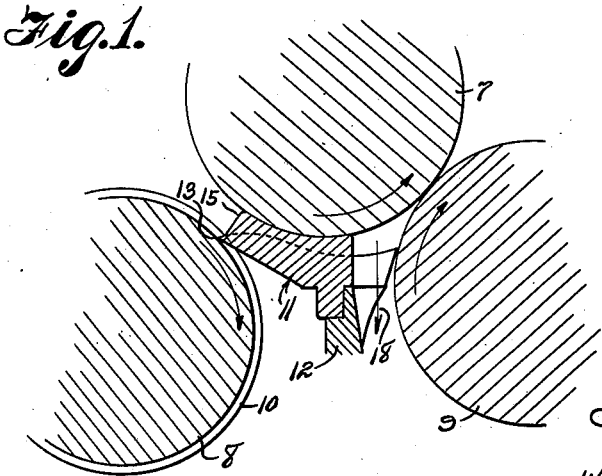
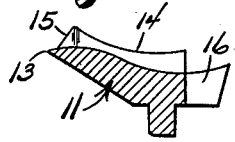
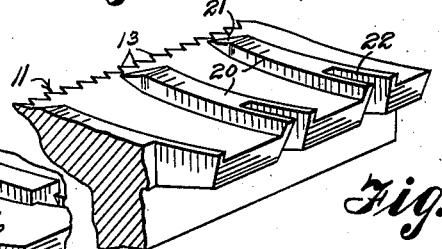
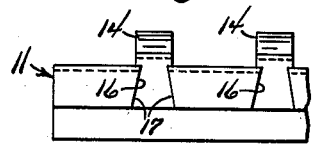
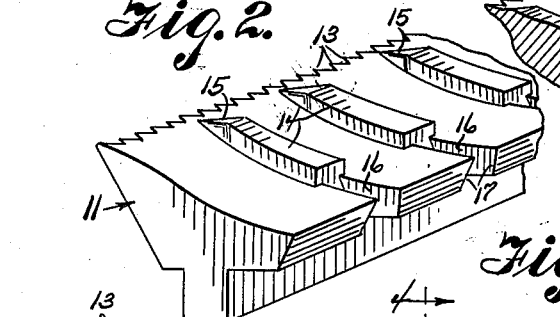
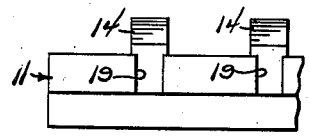
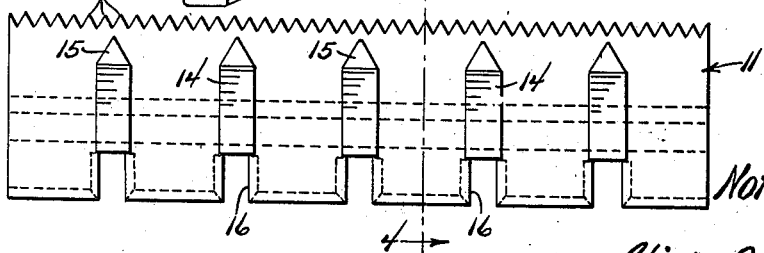
Norberto Capay
INVENTOR
BY Victor J. Evans & Co.
ATTORNEYS Patented Mar. 16, 1943

2,314,074

UNITED STATES PATENT OFFICE 2,314,074

TURNPLATE FOR CANE SUGAR MILLS

Norberto Capay, Victorias, P. I.; vested in the Alien Property Custodian

Application April 8, 1941, Serial No. 387,517

3 Claims. (Cl. 100—47)

The present invention relates to an improvement in sugar cane milling apparatus and more particularly to an improvement in the turn-plates therefor.

The primary object of the invention resides in the provision of a turn-plate, the construction of which permits a greater extraction of sucrose and consequently a lowering of the moisture content in the bagasse.

In present practice, as the bagasse passes between the floating roll and the cane roll of a sugar cane milling apparatus, it is converted into a relatively hard blanket which covers the entire length of the turn-plate between the cane roll and the bagasse roll which makes it relatively impossible for the extracted juice from the bagasse roll to drain through this relatively hard blanket. A certain amount of cane juice will remain on the top surface of the blanket of bagasse which oftentimes will be discharged in a squirting action from the ends of the turn-plate which is detrimental to the lubrication of the rollers. Also, the accumulation of cane juice on the top surface of the blanket of bagasse when contacted by the floating roll will polish the surface thereof and when such rolls become polished, slippage quite frequently occurs over the blanket of bagasse causing detrimental results.

It is, therefore, a further object of the invention to provide a means forming a part of the turn-plate for splitting or separating the blanket of bagasse so that a greater extraction of juice therefrom is made possible.

A still further object of the invention resides in the provision of a turn-plate having a series of raised rib-like portions formed on the upper face thereof adapted to cooperate with the crushing rollers for forming slotted portions in the blanket of bagasse, and grooves cooperating therewith formed in the discharge edge of the turn-plate, the latter permitting free drainage of the juice thereby avoiding re-absorption of the juice by the bagasse.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a transverse sectional view of a type of crushing mill with which the improved turn-plate is used.

Figure 2 is a fragmentary perspective view of the improved turn-plate.

Figure 3 is a top plan view thereof.

Figure 4 is a detail sectional view taken substantially on line 4—4 of Figure 3.

Figure 5 is a fragmentary end elevational view of the turn-plate.

Figure 6 is a view similar to Figure 5 of a modified form of the invention.

Figure 7 is a fragmentary perspective view of a modified form of the invention.

Referring to the drawing for a more detailed description thereof, the crusher, as best noted in Figure 1, comprises an upper or floating roll 7, a cane roll 8 and a bagasse roll 9 arranged in a framework, not shown, in a manner well known in the art. The rollers are conventionally provided upon their cylindrical surfaces with a plurality of upstanding ribs 10 which effect the crushing of the sugar cane as it is fed through the rollers. The rollers are mounted in the framework so as to be driven in the direction of the arrows as indicated upon each roll by a means well known in the art, not shown.

The turn-plate, the specific construction of which comprises the novelty of the present invention, is generally designated by the reference numeral 11 and is mounted between the series of rollers, as shown in Figure 1 of the drawing, upon the usual support 12, said support being suitably mounted to the framework. The turn-plate 11, more particularly shown in Figure 2 of the drawing, is formed with a plurality of V-shaped teeth 13 on its leading edge, said teeth being constructed for cooperation with the ribs 10 as the sugar cane is fed to the cane roll 8. It is to be understood that the purpose of the turn-plate 11 is to direct the bagasse as it travels between the rollers 7 and 8 toward the roller 9 for further action by the rollers 7 and 9. In ordinary practice, the bagasse travelling over the turn plate 11 is in the form of a relatively hard blanket rendering it practically impossible for the extracted juice to drain therethrough. A feature of the present invention consists in the provision of a multiplicity of upstanding ribs 14 formed on the upper face of the turn-plate adapted to cut through the relatively hard blanket of bagasse to form passages for the discharge of the juice. One end of the ribs is formed with a tapering edge 15 designed for the purpose of avoiding resistance to the bagasse as it passes through the rollers 7 and 8 and onto the turn-plate 11. Otherwise, the raised ribs would tend to interfere with the normal travel of the bagasse at these points. As more particularly shown in Figure 2, a multiplicity of the ribs 14 are formed in spaced relation on the top face of the turn-plate so that the entire width of the bagasse as it contacts the turn-plate will be acted upon by the ribs.

The material of the plate in the rear of the ribs is removed to form open spaced slots 16 through which the extracted juice can flow. In the preferred form of the invention, the slots 16 are narrower in width than the ribs 14 and said slots flare downwardly as indicated at 17 in Figure 5 of the drawing to avoid choking thereof due to the expansion of the blanket of bagasse after it travels over the ribs. The bevelling of the slots 16 also permits an uninterrupted flow of the juice. This will be readily understandable from an inspection of Figure 1 of the drawing wherein it will be seen that the juice will flow downwardly in an uninterrupted manner in the direction of the arrow 18.

Thus it will be seen that with the use of the improved turn-plate, the blanket of bagasse instead of being a relatively hard flat mass of material, will be acted upon by the ribs 14 to form spaced openings therein which will permit the juice as expressed to flow rearwardly toward the slots 16 for discharge into the juice pan, not shown. This will substantially eliminate any residue of juice on the top surface of the bagasse which would ordinarily be acted upon by the floating roll 7, which juice is occasioned by a certain amount of re-absorption by the bagasse. The juice on the top surface of the blanket of bagasse is detrimental to the roll because of its polishing tendencies and should the roll become overly polished, slippage over the blanket of bagasse would quite frequently occur.

In Figure 6 of the drawing, there is shown a modified form of the invention, which differs from the preferred form only in the shape of the slots 19, said slots corresponding to the slots 16 in the preferred form. It will be observed that in this form of the invention the walls of the slots are relatively straight instead of being cut at an angle as in the preferred form of the invention. In some instances it may be desired to form grooves having a straight edge instead of a bevelled one.

In the modification shown in Figure 7, the ribs 20 extend throughout the entire width of the plate 11. One end of the ribs 20 is formed with a tapered edge 21, as in the preferred form, while the other end is formed with slots 22 through which the extracted juice can flow.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In a turn plate for crusher mills, a plurality of parallel ribs formed transversely of the top face of the plate, the front end of each of the said ribs being bevelled at the top and sides to form a tapering point terminating adjacent the leading edge of the plate.

2. In a turn plate for crusher mills, an elongated plate having a curved top surface formed with teeth at the leading edge thereof, and a plurality of elongated ribs formed in spaced relation transversely of the top surface of the turn plate having the front end portions bevelled at the top and sides so that the said front end portions have a diminishing taper toward the forward extremity terminating adjacent the teeth of the leading edge, the said plate having transverse slots at the rear of each rib opening into the rear edge of the plate.

3. A turn plate for crusher mills comprising a plate body having a plurality of parallel ribs formed thereon, each of the said ribs having one end bevelled at the top and sides to form a tapered end portion diminishing to a point at its extremity directed toward the leading edge of the plate.

NORBERTO CAPAY.